United States Patent Office 2,818,272
Patented Dec. 31, 1957

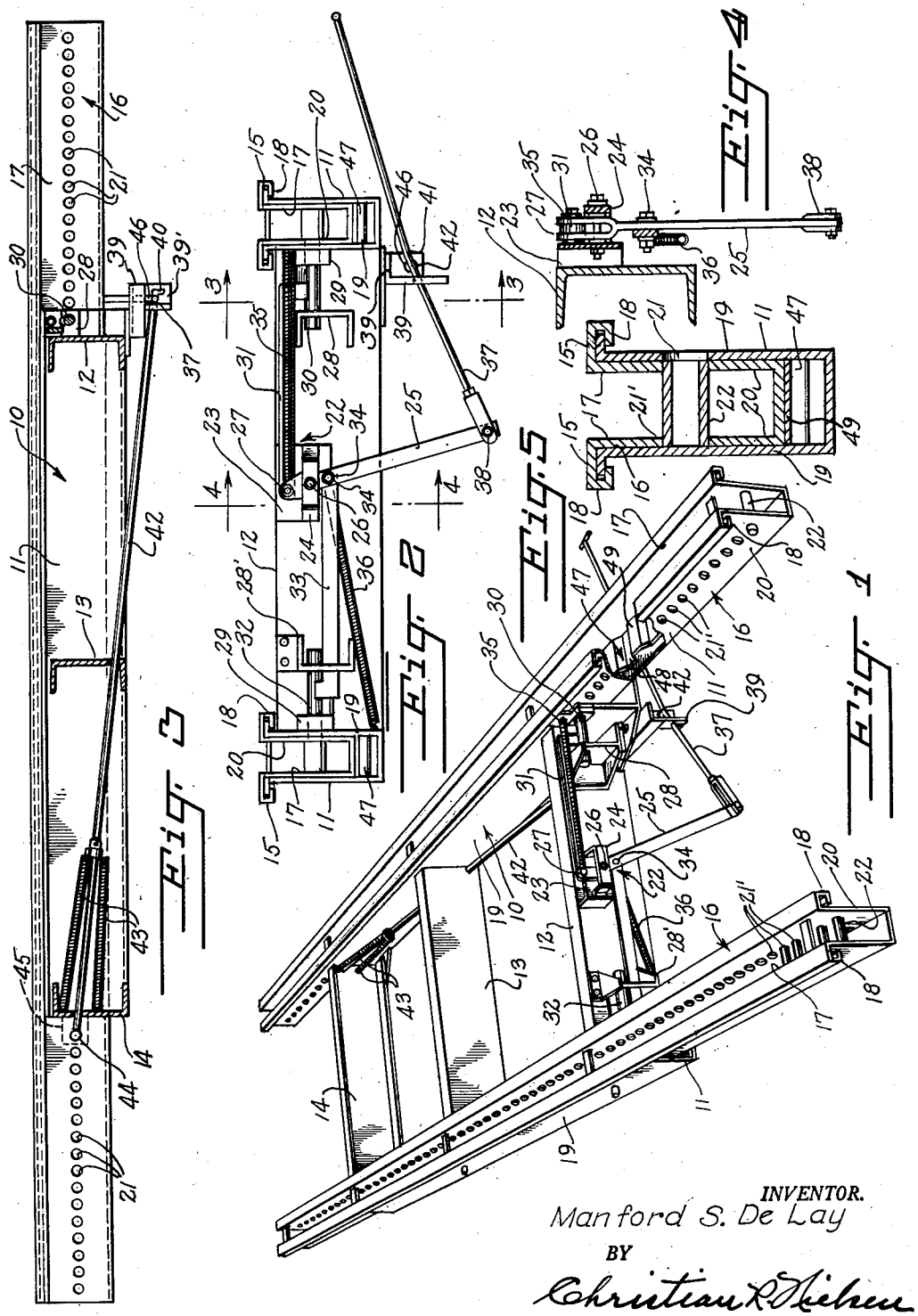

2,818,272

ADJUSTING AND LOCKING DEVICE FOR RELATIVELY MOVABLE MAIN AND AUXILIARY TRAILER FRAMES

Manford S. De Lay, St. Louis, Mo., assignor to De Lay Industries, Inc., St. Louis, Mo.

Application August 27, 1954, Serial No. 452,583

5 Claims. (Cl. 280—106)

This invention relates to a load equalizing device for use on tractors and trailers carrying heavy loads and it consists in the constructions, arrangements and combinations herein described and claimed.

An object of the invention is the provision of a load equalizing device, as set forth in my Reissue Patent 23,704, issued September 1, 1953, in which an auxiliary frame is mounted upon or attached to the supporting axles and wheels of the trailer body and in which a semi-automatic manual adjusting and locking mechanism is employed to secure the auxiliary and main frames in a desired adjusted position.

More specifically, it is an object of the invention to provide a simple, yet practical interconnection between the auxiliary and main frames, permitting ready longitudinal sliding movement between the frames for adjustment, yet preventing displacement of the frames in an upward or downward direction, which might occur in the case of an unbalanced load on the trailer, and further providing a simple semi-automatic manual adjusting and locking means for securing said frame in an adjusted position.

Additional objects, advantages and features of invention will be apparent from the following description considered in conjunction with the accompanying drawing, wherein;

Figure 1 is a perspective view of a main and auxiliary frame of a trailer construction, illustrating the relation of the semi-automatic adjusting and locking means for maintaining an adjusted position between the frames.

Figure 2 is an end view of the assembled frames illustrating the locking means for the frames.

Figure 3 is a longitudinal section taken on the line 3—3 of Figure 2, illustrating the construction of the automatic locking device.

Figure 4 is a cross section on the line 4—4 of Figure 2, and

Figure 5 is a cross section through the channel members of the assembled frames.

There is illustrated a frame 10 of a trailer frame (the wheels and axle not being shown) which comprises a pair of substantially U-shaped channel members 11 connected together in spaced relation by cross braces 12, 13 and 14 to form a rigid structure. The upper edges of the channel members 11 are formed with laterally extended horizontal flanges 15 for a purpose now to be described, attention being directed particularly to Figure 5 of the drawing.

The trailer frame 16 consists of a pair of channel members 17 of such dimensions as to be nested slidably in the trailer wheel-supported frame channels 11 and in order to maintain the channel members 11 and 17 in assembled relation, the channel members 17 are formed at their upper edges with a recurved flange 18 adapted to extend inwardly below the flanges 15 of the channels 11.

The upright walls 19 and 20 of the channel members 11 and 17 are formed with a plurality of longitudinally spaced openings 21 and 21' respectively adapted to be brought into registry for receiving a lock pin and maintain the channel members in longitudinal adjusted positions when the channel members are moved relatively to each other, as will be described. The openings 21' are reinforced by a welded in pipe-shaped sleeve 22 to increase pin wearing surface.

The locking means as shown in Figure 1, is mounted upon the cross brace 12, and comprises a bracket 23 positioned medially of the longitudinal axis of the frame 11, the bracket being welded or otherwise secured to the cross brace. The bracket 23 includes a yoke 24 spaced therefrom and receives a lever 25 therebetween, the lever being pivoted as at 26 and has an upper forked end 27 above the yoke 24.

In order to support the locking pins, the upright wall 19 of the channels 11 are provided with brackets 28 and 28' suitably secured to the cross brace 12, these brackets extending parallel but spaced from the upright walls 19 and are suitably apertured to register with the openings 21, 21' and sleeves 22 of the channel members, and for additional support and guidance of the locking pins an apertured boss 29 is welded to the walls 19, which of course is aligned with the openings 21 and sleeves 22.

The bracket 28 has an opening aligned with the boss 29 and slidably mounted in the aligned openings there is a pin 30, the pin having a link 31 integrally formed therewith and extending inwardly of the frame and is pivotally mounted in the yoke 27. A pin 32 is slidably mounted in an opening formed in the bracket 28' and the boss 29. The pin 32 is provided with a link 33 integrally formed therewith extended through a slot formed in the bracket 28', the end of the link being pivotally connected to the lever 25 as at 34. In order that the pin 30 may be retained in its projected position, a helical spring 35 is connected between the yoke 27 and the frame 11, while the pin 32 is tensioned by means of a helical spring 36 secured between the frame 11 and the pivot 34.

Obviously, the pins 30 and 32 must be retracted and held in such positions when adjusting the position of the axles under the trailer body, and to this end an operating lever 37 is employed, one end of which is pivotally connected as at 38 to the lower end of the lever 25. The bracket 39 includes a depending flange 39' formed with a bayonet slot 40 through which the lever 37 is extended and in addition has a right angular flange 41 provided with an aperture for support of a release rod 42.

As shown in Figures 2 and 3, the lever 37 has been moved so as to retract the pins 30 and 32 and is seated in the horizontal portion of the bayonet slot 40 in the path of movement of the release rod 42. The rod 42 extends through suitable openings formed in the cross braces 13 and 14 and is tensioned by helical springs 43, the ends of which are connected to the rod 42 and the cross brace 14. The rod 42 projects beyond the cross brace 14 and terminates in the medial axis of the openings 21 of the channel 11. A removable pin 44 is selectively insertable in the openings 21 and functions as a releasing means for the rod 42, as will be explained, said pin being retained by means of a spring tongue 45 in contact with the head of the pin, said tongue being positioned at the end of the wall 19 and is indicated by dotted lines in Figure 3.

The operation of the device is as follows:

When a load requirement necessitates a shifting of the frame 10 with respect to the frame 16, the operator pulls outwardly upon the lever 37 and moves it upwardly so as to engage the horizontal portion of the bayonet slot 40. A lug 46 on the lever 37 will retain the lever in such position. When the lever 37 was drawn outwardly, the lever 25 would have been rocked in a corresponding direction, thus imparting movement to the links 31 and 33 to withdraw the pins 31 and 32 from the openings 21 and sleeves 22 of the frames. The frames 10 and 16 are then free for relative sliding movements for equalizing the load between the tractor axle and the trailer axle. The operator now inserts the pin 44 in a desired opening 21 in the frame 10, and by locking the wheels of the trailer and moving the tractor and trailer body forward, the pin 44 will engage the projecting end of the rod 42 and impart a forward movement of the rod causing it to engage the lever 37, forcing it to a released position within the bayonet slot 40. Upon release of the lever 37, the springs 35 and 36 will project the pins 30 and 32 into aligned openings of the channels 11 and 17 and thus secure the frames in adjusted positions.

To facilitate sliding movements of the frames a corrugated slide 47 is provided between the walls of the channel members 11 of the frame 10. The slide 47 comprises a series of grease pockets 48 and flat slide faces 49, the pockets and faces extending transversely between the walls of the channel members 11. Thus the channel members 17 are slidably supported upon the lubricated faces 49. The pockets may be maintained full of grease by the use of suitable grease fittings.

While I have shown and described a preferred form of the device, this is by way of illustration only, and I consider as my own all such modifications in construction as fairly fall within the scope of the appended claims.

I claim:

1. A semi-automatic and manual adjusting and locking means for coupling the frame of a trailer body with the auxiliary frame of the trailer-wheel supported axles comprising a pair of parallel channel members, said trailer frame comprising a pair of parallel channel members normally slidable within the channel members of the auxiliary trailer axle frame, each of said channel members having aligned apertures, said auxiliary frame having a transverse brace, a bracket secured to said transverse brace, a lever pivotally mounted on said transverse brace, a bracket supported by said transverse brace extending parallel to respective channel members of the trailer frame, a pin slidably supported in each bracket, each pin including an integral link pivotally connected to said lever, spring means connected between the lever and the auxiliary frame for projecting said pins in aligned apertures of the trailer and auxiliary frame channels, a bracket carried by the auxiliary frame having a bayonet slot formed therein, an operating lever extending exterior of the trailer frame and through said bayonet slot and connected to said first named lever for oscillating said lever to retract said pins, said operating lever including a lug for retaining the pins in retracted positions, a spring tensioned rod slidably carried by said trailer frame and engageable with a pin selectively engaged in an aperture of said trailer frame to impart movement of said rod against said operating lever to release said lug from said bayonet slot.

2. A semi-automatic and manual adjusting and locking means for coupling the frame of a trailer body with the auxiliary frame of the trailer wheel-supported axles comprising a pair of parallel channel members, a trailer body frame comprising a pair of parallel channel members normally slidable within the channel members of the auxiliary trailer axle frame, each of said channel members having aligned apertures, said trailer body frame having a transverse brace, a bracket secured to said transverse brace, a lever pivotally mounted on said brace, pin members slidably supported by said transverse brace and operatively connected to one end of said lever, spring means connected to said lever for urging said pin members into aligned apertures of said channel members, manually operative means connected to said lever for retracting said pins, including means for retaining said pins in retracted position, and means for releasing said manually operative means upon a predetermined sliding movement between said channel members, said means comprising a spring tensioned rod movable with said auxiliary frame, slidably supported and engageable with a pin selectively engaged in an aperture of said trailer frame to impart movement of said rod against said manually operative means.

3. In a motor vehicle having a body slidably mounted on a running gear, a pre-selector for positioning the body load relative to the running gear comprising a plurality of spaced apertures provided in each side of the body, an aperture provided in each side of the running gear, spring-urged coupling rods carried by the running gear and extending through said running gear apertures and a pair of body apertures, means to retract said rods from said body apertures, means to release said retracting means and thereby allow said rods to engage in a pre-selected pair of body apertures, and means correlated with said body apertures automatically to actuate said releasing means upon predetermined movement of said body on said running gear.

4. In a motor vehicle having a body slidably mounted on a running gear, a plurality of spaced apertures provided in each side of said body, a pair of interconnected coupling rods carried by the running gear, springs urging said rods into a pair of said apertures, means to retract said coupling rods, means to hold said rods in the retracted position, means reactive upon said holding means to release the same and allow said springs to urge the rods into a pre-selected pair of said body apertures, and means correlated with the spacing of said body apertures and reactive upon said release means upon predetermined movement of said body on said running gear.

5. In a motor vehicle having a body slidably mounted on running gear, a pair of pivotally interconnected coupling rods slidably mounted on said running gear for movement from a retracted to a body-coupling position, means normally urging said rods into the body-coupling position, means selectively to retain said rods in the retracted and in the body-coupling position, and means responsive to a predetermined movement of said body on said running gear to release said retaining means at a predetermined time to allow said rods-urging means to move said rods from the retracted to the body-coupling position.

References Cited in the file of this patent

UNITED STATES PATENTS

| Re. 23,704 | De Lay | Sept. 1, 1953 |
| 2,332,326 | Lex | Oct. 19, 1943 |
| 2,606,769 | De Lay | Aug. 12, 1952 |